United States Patent
Miglani et al.

(10) Patent No.: US 8,682,117 B1
(45) Date of Patent: Mar. 25, 2014

(54) MAKING LIGHTLESS CONNECTIONS IN AN OPTICAL CIRCUIT SWITCH

(71) Applicant: CALIENT Technologies, Inc., Goleta, CA (US)

(72) Inventors: Jitender Miglani, Hollis, NH (US); Michael Deacon, Ventura, CA (US); Vijayan Thattai, Goleta, CA (US)

(73) Assignee: Calient Technologies, Inc., Goleta, CA (US)

( * ) Notice: Subject to any disclaimer, the term of this patent is extended or adjusted under 35 U.S.C. 154(b) by 0 days.

(21) Appl. No.: 14/040,448

(22) Filed: Sep. 27, 2013

Related U.S. Application Data

(63) Continuation of application No. 13/958,872, filed on Aug. 5, 2013.

(51) Int. Cl.
*G02B 6/35* (2006.01)
*G02B 26/08* (2006.01)

(52) U.S. Cl.
USPC .......................................... 385/18; 359/223.1

(58) Field of Classification Search
CPC ............................ G02B 6/3518; G02B 6/3566
USPC .................... 385/18; 359/223.1, 225.1, 226.1
See application file for complete search history.

(56) References Cited

U.S. PATENT DOCUMENTS

| | | | |
|---|---|---|---|
| 5,037,173 A | 8/1991 | Sampsell et al. | |
| 6,097,860 A | 8/2000 | Laor | |
| 6,411,751 B1 | 6/2002 | Giles et al. | |
| 6,456,751 B1 | 9/2002 | Bowers et al. | |
| 6,556,739 B1 | 4/2003 | Kruglick et al. | |
| 6,567,574 B1 | 5/2003 | Ma et al. | |
| 6,571,029 B1 | 5/2003 | Kruglick et al. | |
| 6,587,611 B1 * | 7/2003 | Hunt | 385/18 |
| 6,628,041 B2 | 9/2003 | Lee et al. | |
| 6,690,885 B1 | 2/2004 | Aksyuk et al. | |
| 6,728,016 B1 * | 4/2004 | Hunt et al. | 359/223.1 |
| 6,792,177 B2 * | 9/2004 | Welsh et al. | 385/18 |
| 6,798,992 B1 | 9/2004 | Bishop et al. | |
| 6,819,815 B1 | 11/2004 | Corbalis et al. | |
| 6,823,101 B2 | 11/2004 | Gates, II et al. | |
| 6,836,381 B2 | 12/2004 | Giles et al. | |
| 6,898,341 B2 * | 5/2005 | Huang et al. | 385/18 |
| 6,980,712 B2 * | 12/2005 | Huang et al. | 385/18 |
| 7,190,509 B2 * | 3/2007 | Bruns | 359/299 |
| 7,676,125 B2 | 3/2010 | Zheng et al. | |
| 2009/0323149 A1 * | 12/2009 | Mizukami et al. | 359/221.2 |

* cited by examiner

*Primary Examiner* — Omar Rojas
(74) *Attorney, Agent, or Firm* — SoCal IP Law Group LLP; Steven C. Sereboff; John E. Gunther

(57) ABSTRACT

Methods of operating an optical circuit switch and optical circuit switches are disclosed. A command to make an optical connection between a first port and a second port may be received, the first port uniquely associated with a first rotatable mirror element and the second port uniquely associated with a second rotatable mirror element. A determination whether or not input signal light is present at the first port may be made. When light is present at the first port, the first mirror element and the second mirror may be rotated to provide an initial optical connection between the first port and the second port. When light is not present at the first port, the first mirror element and the second mirror element may be placed in respective at-rest positions.

25 Claims, 6 Drawing Sheets

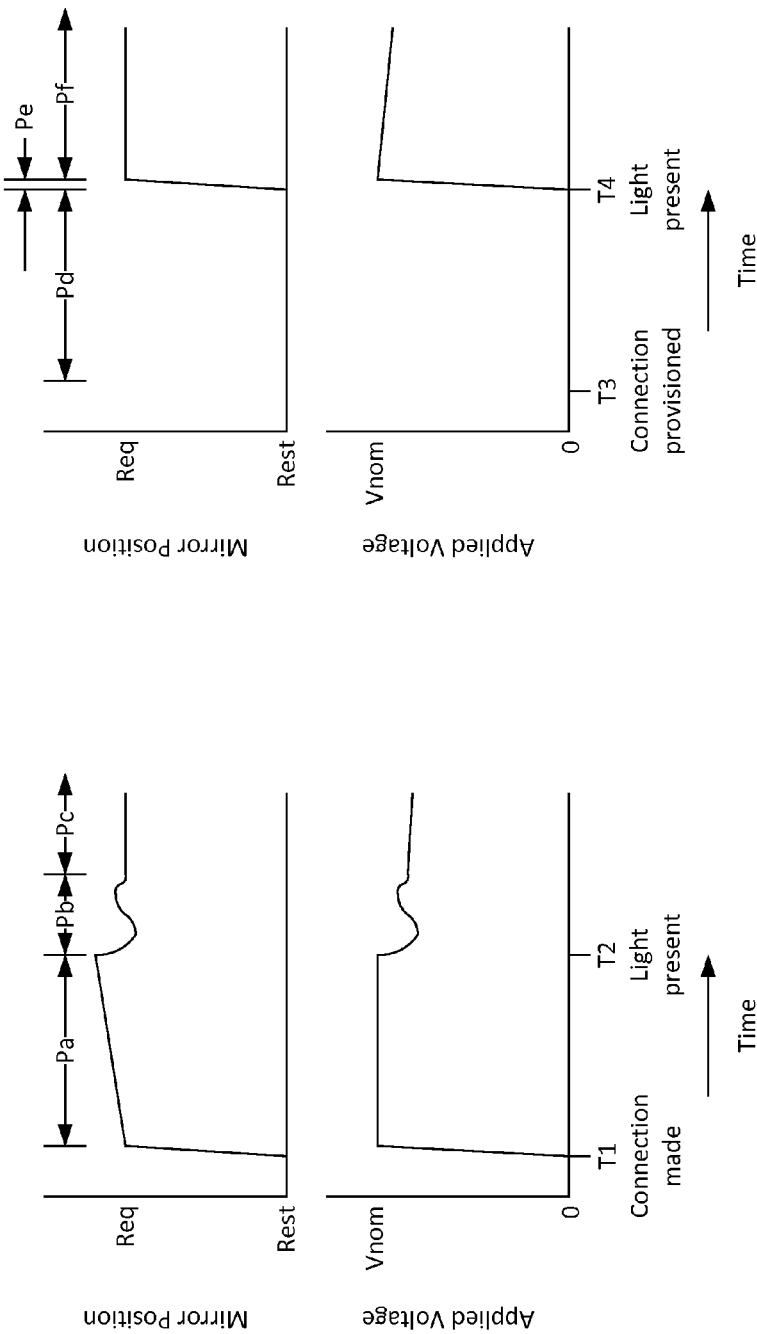

US 8,682,117 B1

MAKING LIGHTLESS CONNECTIONS IN AN OPTICAL CIRCUIT SWITCH

RELATED APPLICATION INFORMATION

This patent is a continuation of application Ser. No. 13/958,872, filed Aug. 5, 2013, titled MAKING LIGHTLESS CONNECTIONS IN AN OPTICAL CIRCUIT SWITCH.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

DESCRIPTION OF THE DRAWINGS

FIG. 6A is a graph illustrating a position versus time characteristic of a hypothetical mirror element in an optical circuit switch.

FIG. 6B is a graph illustrating a position versus time characteristic of a hypothetical mirror element in an optical switch operated according to the process of FIG. 5.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
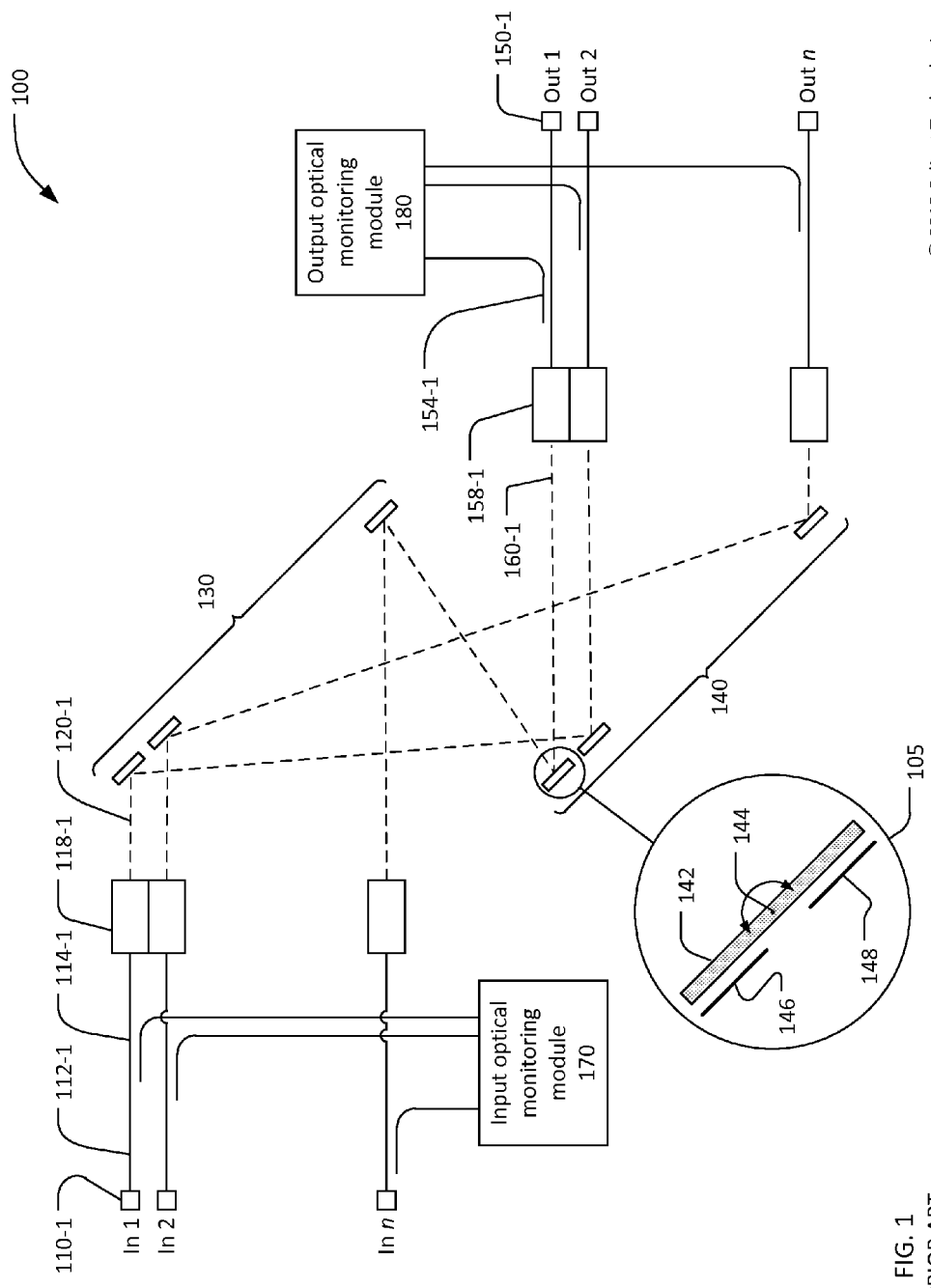
FIG. 1 is an optical schematic diagram of an optical circuit switch.

Referring now to FIG. 1, an exemplary optical circuit switch 100 may be configured to connect a group of n input ports (where n is an integer greater than 1), labeled In 1 to In n, to a group of n output ports, labeled Out 1 to Out n. More specifically, the optical circuit switch 100 may selectively connect up to n pairs of ports, where each pair of ports includes an input port and an output port.

Each of the input ports In 1 to In n may include a connector (of which only the connector 110-1 is identified) to receive an input optical signal from a optical fiber cable (not shown) external to the optical circuit switch. Each connector may be coupled by a respective optical fiber (of which only optical fiber 112-1 is identified) to a respective tap coupler (of which only tap coupler 114-1 is identified). Each tap coupler may extract an input sample portion, for example 1% to 10%, of the input optical signal from the respective optical fiber. Each input sample portion may be directed to an input optical monitoring module 170. The remainder of the input optical signals, other than the input sample portions, may be conveyed by respective optical fibers to respective collimator lenses (of which only collimator lens 118-1 is identified). Each collimator lens may convert the input optical signal from the respective optical fiber into a collimated input optical beam (of which only input optical beam 120-1 is identified) in free space. Free space optical beams are shown in FIG. 1 as dashed lines.

Each input optical beam, such as input optical beam 120-1, may be directed onto a first mirror array 130. The first mirror array 130 may include n mirrors with a one-to-one correspondence between input optical beams and mirrors, such that each input optical beam is directed onto a respective mirror. To improve the manufacturing yield of the first mirror array, the first mirror array 130 may include more than n mirrors, in which case the n input optical beams may be directed to a subset of n mirrors that are known to be fully functional. Since each of the n input optical beams originates from a specific port and is directed onto a specific mirror, each port may be described as "uniquely associated" with a corresponding mirror. In this patent, "uniquely associated" means a one-to-one correspondence. To take advantage of the available fully functional mirrors, the associations between ports and mirrors may be different in different optical circuit switches Each mirror on the first mirror array 130 may reflect the respective input optical beam to a selected mirror of a second mirror array 140. The mirrors of the second mirror array 140 may reflect the incident beam to form a respective output optical beam (of which only output optical beam 160-1 is identified). Each output optical beam may be directed to a corresponding focusing lens (of which only focusing lens 158-1 is identified). Each focusing lens may focus the respective output optical beam into an output optical signal in a respective optical fiber. Each output optical signal may be conveyed to a respective output tap coupler (of which only output tap coupler 154-1 is identified). Each output tap coupler may direct a sample portion (for example 1% to 10%) of the respective output optical signal to an output optical monitoring module 180. The remainder of each output optical signal, other that the respective sample portion, may be conveyed to a respective output port connector (of which only connector 150-1 is identified).

The optical circuit switch 100 may create a one-to-one connection between each input port and any one of the output port. For example, as shown in FIG. 1, Port In 1 is connected to port Out 2, port In 2 is connected to port Out n, and port In n is connected to port Out 1.

The detail view 105 shows a simplified schematic diagram of a mirror from either the first mirror array 130 or the second mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element 142 may be coupled to a first electrode 146 and a second electrode 148. The mirror element 142 may be rotated by electrostatic attraction between the mirror element and either the first electrode 146 or the second electrode 148.

For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction. The first electrode 146 and the second electrode may be "dedicated" to the mirror element 142, which is to say the only function of the electrodes 146 and 148 is to rotate the mirror element 142 and the voltages applied to the electrodes 146 and 148 have no effect on any mirror element other than the mirror element 142.

In the simplified example of FIG. 1, the mirror element 142 rotates about a single axis defined by the torsion bars 144. Either or both of the first mirror array 130 and the second mirror array 140 may include mirrors configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the simplified schematic detail view 105. For example, U.S. Pat. No. 6,628,041 describes a MEMS mirror array having two-axis mirror motion and comb actuators.

The input optical monitoring module 170 and the output optical monitoring module 180 may be a common module. The input optical monitoring module 170 and the output optical monitoring module 180 may measure the optical power in each of the input sample portions and output sample portions, respectively. Each of the input optical monitoring module 170 and the output optical monitoring module 180 may include an optical power detector for each sample portion. Alternatively, each of the input optical monitoring module 170 and the output optical monitoring module 180 may time-multiplex a single detector or an array of detectors such that each detector measures the optical power of sequence of sample portions. For example, each of the input optical monitoring module 170 and the output optical monitoring module 180 may use a scanning mirror to direct sample portions to a single detector or an array of detectors as described in U.S. Pat. No. 7,676,125.

Sample portions may be extracted from the input optical beams, such as input optical beam 120-1, and/or the output optical beams, such as output optical beam 160-1, using one or more free space sampling optical elements. For example, sample portions may be extracted as described in U.S. Pat. No. 6,597,825 or U.S. Pat. No. 6,668,108. Input tap couplers, such as input tap coupler 114-1 and/or output tap couplers, such as output tap coupler 154-1, may not be present when free-space sampling optical elements are used to extract sample portions.

Figure 2:
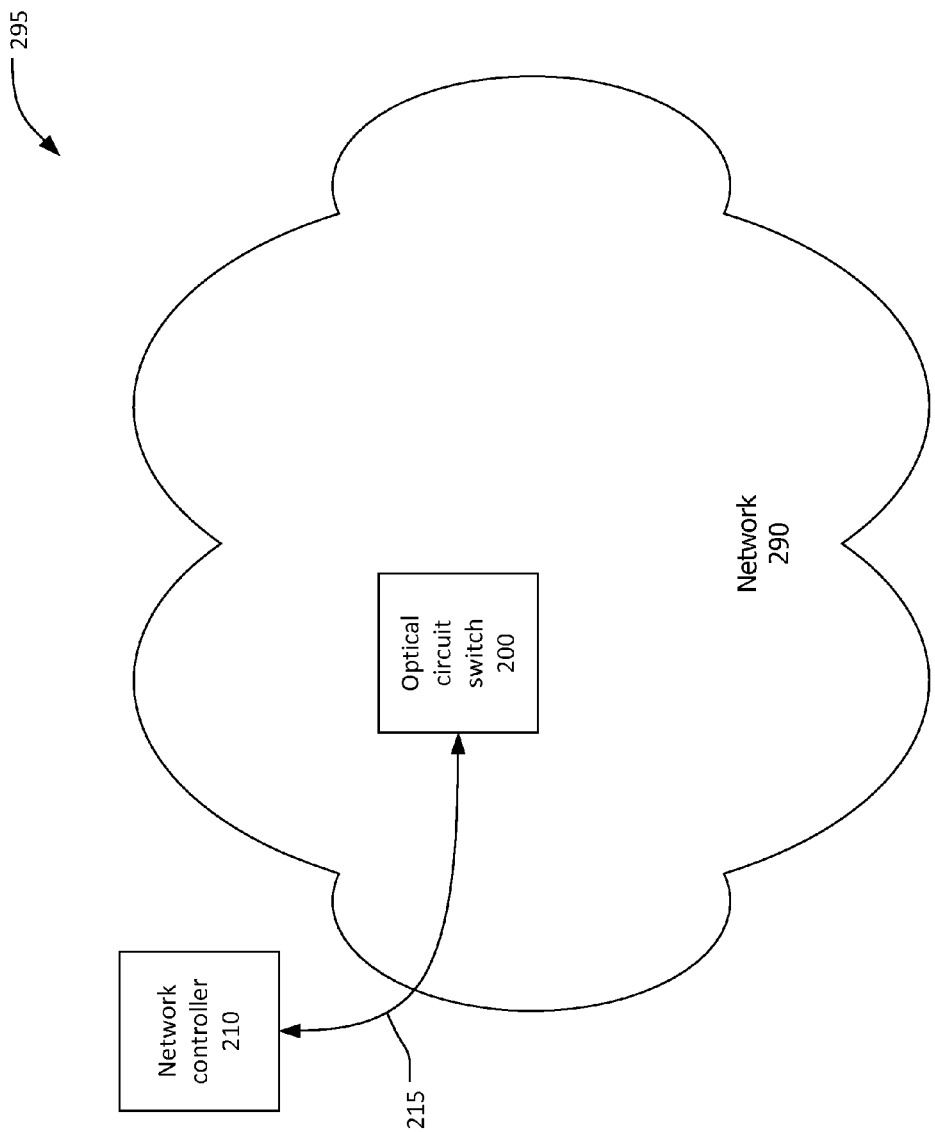
FIG. 2 is a block diagram of an environment for an optical circuit switch.

Referring now to FIG. 2, an environment 295 for the application of an optical circuit switch 200 may include a network 290 and a network controller 210. The optical circuit switch 200, which may be the optical circuit switch 100, may be disposed within the network 290 and may function to switch optical connections between other nodes (not shown) within the network 290. The network 290 may be, for example, a wide area network, a local area network, a storage area network, a private network within a data center or computer cluster, and may be or include the Internet. While the connections switched by the optical circuit switch 200 are optical, other connections within the network 200 may be wired and/or wireless.

The network controller 210 may be a computing device that provides a graphic user interface or a command line interface for a network operator to enter connection commands (i.e. commands to make or break one or more optical connections) for the optical circuit switch 200. The network controller 210 may be a computing device running network management software, in which case connection commands for the optical circuit switch 200 may be generated automatically by the network controller 210.

A communications link 215 between the optical circuit switch and the network controller 210 may be in-band, which is to say the communications link 215 may be a path within the network 290. In this case, the optical circuit switch may have a wired, wireless, or optical connection to the network in addition to the optical connections being switched. The communications link 215 may be out-of-band, which is to say the communications link 215 may be a dedicated connection or a connection via a command network independent from the network 290. A configuration in which the network controller 210 executes network management software to automatically provide connections commands to the optical circuit switch 200 via an out-of-band command network 215 is an example of what is commonly called a "software defined network".

Figure 3:
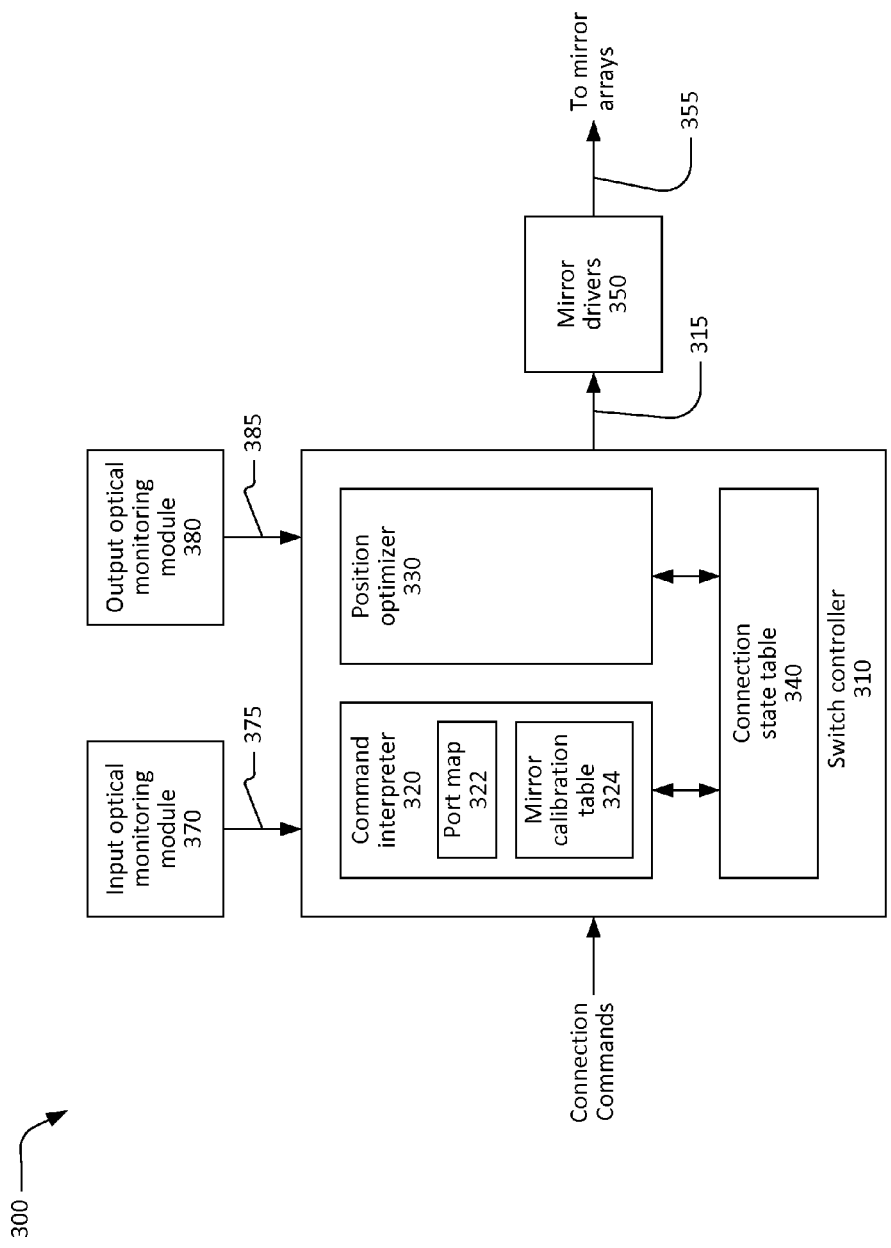
FIG. 3 is a block diagram of an optical circuit switch.

FIG. 3 is a high-level block diagram of the control and mirror driver portions of an optical circuit switch 300, which may be the optical circuit switch 100. The optical circuit switch 300 may include a switch controller 310, an input optical monitoring module 370, an output optical monitoring module 380, and a plurality of mirror driver circuits 350. The optical circuit switch 300 may include one mirror driver circuit 350 for each mirror in two mirror arrays if the individual mirror elements are rotatable about a single axis. The optical circuit switch 300 may include two mirror driver circuits 350 for each mirror in the mirror arrays if the individual mirror elements are rotatable about two orthogonal axes. Each mirror driver circuit 350 may have, for example, two selectable outputs to drive one or the other of a pair of electrodes, as described in pending patent application Ser. No. 13/787,621.

The controller 310 may include a command interpreter 320 and a position optimizer 330 which jointly maintain a connection state table 340. The controller 310 may receive connection commands from an external source such as the network controller 210. The controller 310 may receive connection commands from some other source or in some other manner.

The command interpreter 320 may be responsive to a set of connection commands received by the controller 310. The set of connection commands may include, for example "Break a-b" and "Make a-b". These commands may respectively instruct the optical circuit switch 300 to either break an existing connection between ports a and b (where a is an integer input port number and b is an integer output port number), or to make a new connection between ports a and b. The set of connection commands may include a mass connection command, which may list multiple connections to be made. The mass connection command may be used, for example, when the optical circuit switch is initially integrated into a network or when substantial reconfiguration of the network or data center is required.

The command interpreter 320 may include or have access to a port map 322. As previously described, to allow the use of mirror arrays with a small number of nonoperational mirror elements, the number of mirror elements in each mirror array may be larger than the number of input or output ports. Each input and output port may be coupled to a known operational mirror element in the respective mirror array. The port map 322 may be a table containing data relating each input port to a mirror element in a first mirror array, and data relating each output port to a mirror element in a second mirror array. The data in the port map 322 may be specific to the particular first and second mirror arrays used in the optical circuit switch 300.

There may be some performance variation from mirror element to mirror element and/or from mirror array to mirror array. In particular, there may be some variation in the mirror element rotation angle versus applied voltage characteristics within and between mirror arrays. The command interpreter 320 may include or have access to a mirror calibration table 324 which contains data describing the performance of each mirror element. For example, the mirror calibration table 324 may store the rotation angle versus voltage characteristic of each mirror element. The mirror calibration table 324 may store, for all possible pairs of input and output mirror elements, a set of voltages that, when applied to the appropriate electrodes, will cause the mirror elements to rotate to make the desired connection. The data in the mirror calibration table 324 may be specific to the particular mirror arrays used in the optical circuit switch 300. The data in the mirror calibration table 324 may be derived, for example, from the results of tests performed on the particular mirror arrays used in the optical circuit switch 300.

The data stored in the mirror calibration table 324 may indicate nominal voltages required to initially make desired connections through the optical circuit switch 300. However, once voltages are applied to electrodes associated with a pair of input and output mirror elements to initially make a connection, the positions of the mirror elements may drift over time. The result of mirror element drift may be failure or degradation (e.g. increased insertion loss) of the connection. The mirror arrays used in the optical circuit switch 300 may be fabricated by chemical micromachining of a silicon substrate. For example, each mirror element may consist of a reflective coating on a silicon slab that is connected to the silicon substrate by narrow silicon elements that function as torsion bars. Each silicon mirror slab may be free to rotate about the axis or axes defined by the torsion bars. Mirror element drift may be due to mechanical stress relief of the torsion bars over time. Further, all or portions of the silicon surfaces of the mirror array may be coated with $SiO_2$ or some other dielectric. Electric charge trapped at defects in the insulators layers may contribute to mirror element drift over time. Other causes may also contribute to mirror element drift.

The position optimizer 330 may receive data from the input optical monitoring module 370 and the output optical monitoring module 380 indicating the power levels at the input ports and the output ports, respectively. The position optimizer 330 may determine the insertion loss of each active optical connection (i.e. each optical connection where light is present) from the respective input and output power levels. The position optimizer 330 may periodically adjust the positions of some or all of the mirror elements to minimize the insertion loss of each optical connection. For example, to optimize a connection, the position optimizer 330 may make incremental changes in the position of one of the mirror elements used in the connection and observe the resulting effect on insertion loss. The optimum position of the mirror element may then be found using a hill climbing algorithm or a similar algorithm. The position of each mirror element may be optimized periodically. The time interval between successive optimizations of each mirror element may be short (on the order of seconds) compared to the time constant of the mirror element drift (on the order of hours). Periodic optimization of the position of each mirror element may automatically compensate for mirror element drift.

The command interpreter 320 and the position optimizer 330 may jointly maintain and share the connection state table 340. The connection state table 340 may include data indicative of the state or status of each port of the optical circuit switch 300. Data included in the connection state table 340 for each port may include a first flag indicating if the respective port is available or committed to a connection, and a second flag indicating if the connection has actually been made. The connection state table 340 may include, for input ports, a third flag indicating is light is present at the respective input port. For each port that is committed to a connection, the connection state table 340 may also include the identity of the port at the other end of the connection, the mirror element associated with the port, the voltages presently applied to the electrodes associated with the mirror element, and temporal data such as when the connection was first made and when the position of the mirror element was most recently optimized.

Figure 4:
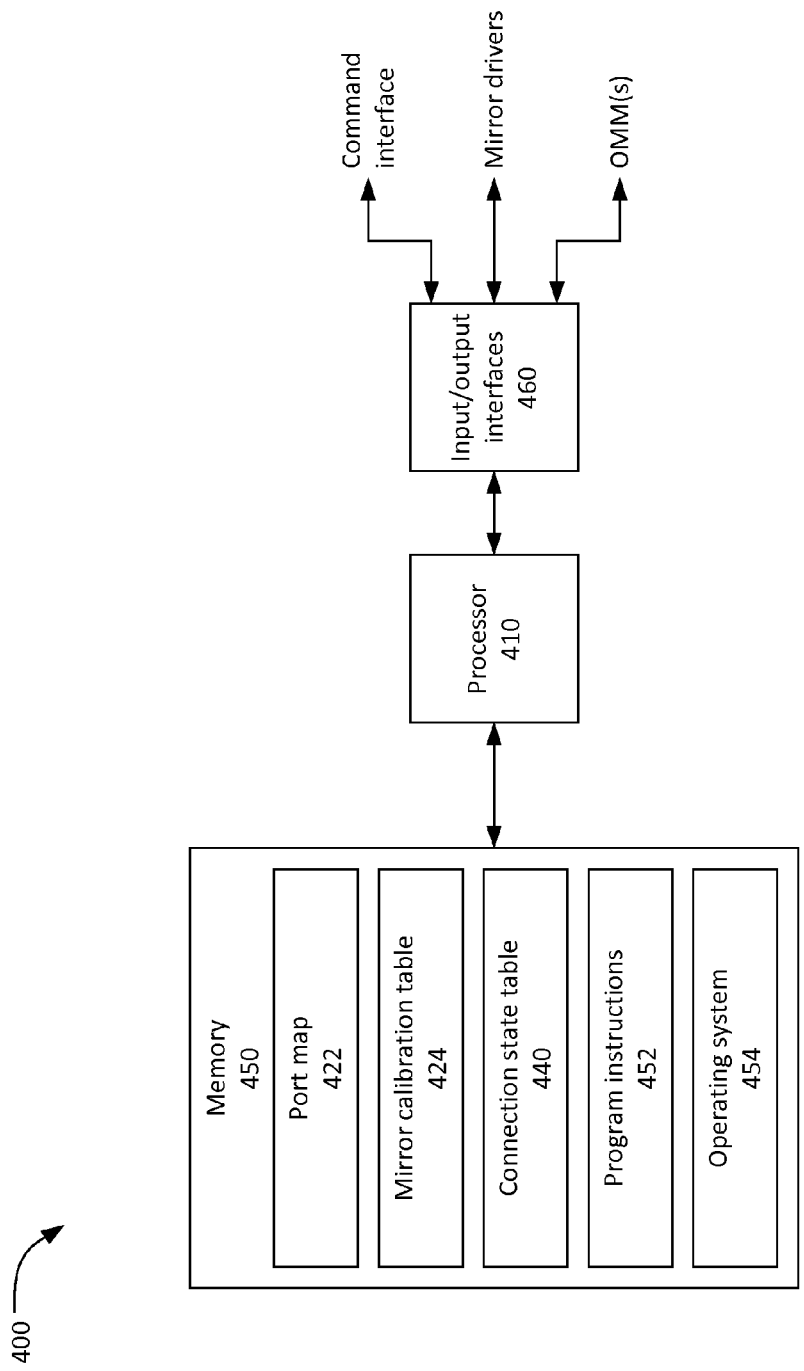
FIG. 4 is a block diagram of a computing device.

Referring now to FIG. 4, a switch controller 400, which may be suitable for use as the switch controller 310 in the optical circuit switch 300, may include a processor 410 coupled to a memory 450 and input/output interfaces 460. The switch controller 400 may implement the functions of the command interpreter 320 and the position optimizer 330.

The processor 410 may include one or more processing devices, such as microprocessors and programmable signal processors, that execute software instructions stored in the memory 450. The processor 410 may include one or more non-programmable processing devices that execute hardware-defined functions. The processor 410 may include other specialized circuits and devices as required to implement the methods and functions described herein. When the processor 410 includes multiple processing devices, the processing devices may be collectively or separately coupled to the memory 450 and the input/output interfaces 460.

The memory 450 may include both nonvolatile memory and volatile memory. The nonvolatile memory may be or include semiconductor read-only memory, semiconductor nonvolatile memory such as flash memory, magnetic storage devices such as magnetic disc drives, and optical storage devices such as CD-ROM or CD-R/W drives. The volatile memory may be static or dynamic semiconductor random access memory (RAM).

The memory 450 may store software instructions for execution by the processor 410. The software instructions may include program instructions 452 and an operating system 454. The program instructions 452 may include instructions to cause the processor 410 to implement all or part of the functions of the command interpreter 320 and the position optimizer 330. The operating system 454 may be, for example, a version of Microsoft Windows®, Unix®, Linux®, Google Chromium®, Apple® MAC OS, or some other operating system.

The memory 450 may store tables, lists, and other data for use by the processor 410. The data stored in the memory 450 may include a port map 422 that identifies which mirror on one of two mirror arrays is associated with each port of the optical circuit switch. The data stored in the memory 450 may include a mirror calibration table 424 which contains data describing the performance of each movable mirror in the optical circuit switch. The data stored in the memory 450 may include a connection state table 440 listing a status of each port, mirror, and connection and associated information.

The input/output interfaces 460 may include circuits, devices, and/or firmware to transfer data between the processor 410 and one or more optical monitoring modules (OMMs), a large plurality of mirror drivers, and a connection to a network controller such as the network controller 210.

Description of Processes

Figure 5:
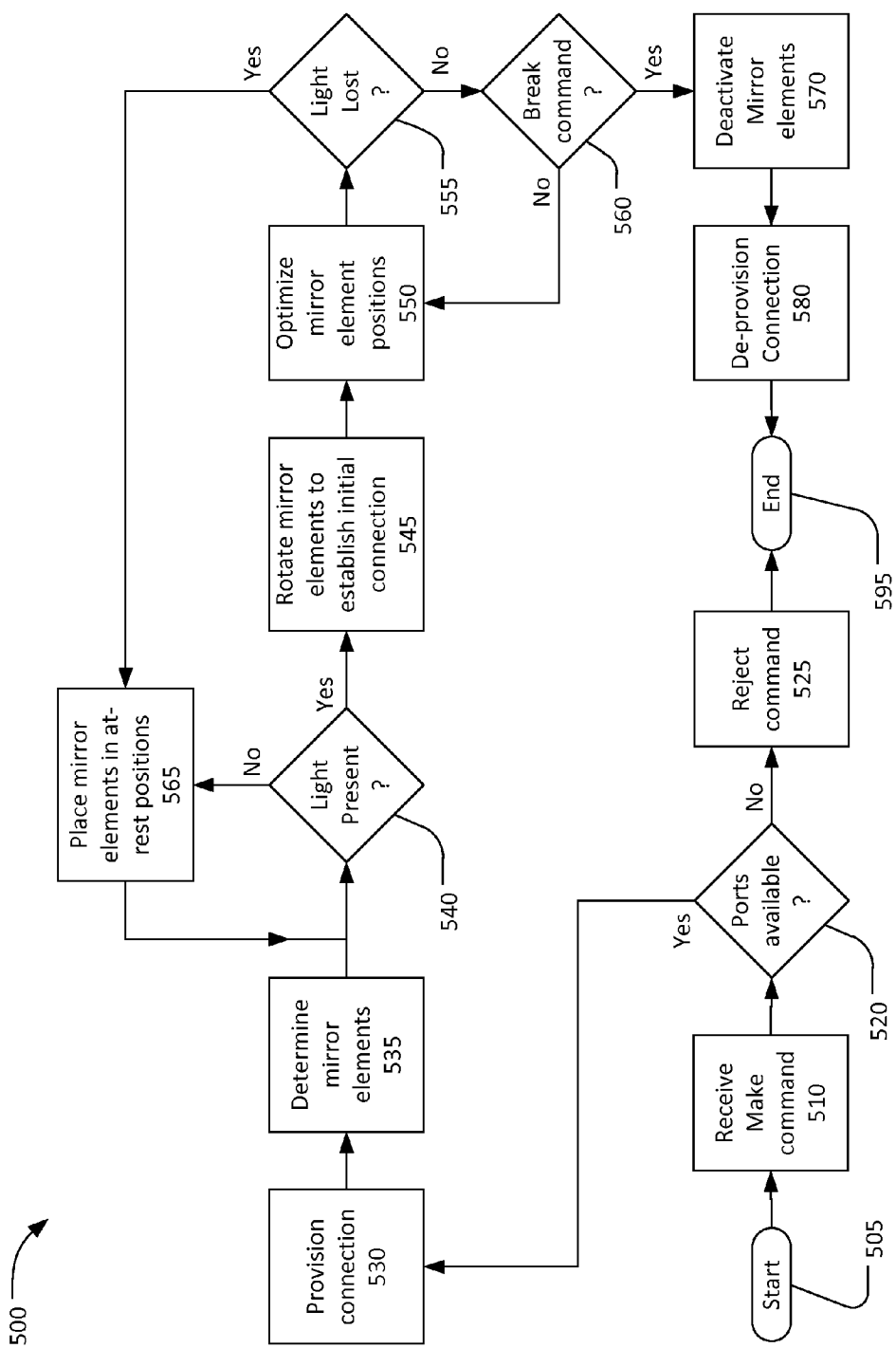
FIG. 5 is a flow chart of a process for operating an optical circuit switch.

Referring now to FIG. 5, a process 500 to make a connection through an optical circuit switch, such as the optical circuit switch 100, may start at 505 and end at 595. The process 500 may be repeated numerous times during the operation of an optical circuit switch to make a corresponding number of connections. The process 500 may be executed by a controller, such as the controller 310 or the controller 400.

At 510, a Make command may be received, for example, from a network controller such as the network controller 210. The Make command may identify one or more connections to be made through the optical circuit switch. For each connection, the Make command may specify an input port and an output port to be connected. For ease of discussion, the subsequent description of the process 500 will be directed to making a single connection, with the understanding that the actions of the process 500 may performed, sequentially or concurrently, for each of a plurality of connections.

At 520, a determination may be made if the input and output ports identified in the Make command are available. For example, a determination may be made whether or not both the input port and the output ports are listed as uncommitted in the connection state table 340. If one or both ports are not listed as uncommitted in the connection state table 340 ("no" at 520), the command may be rejected at 525, and the process 500 may end at 595. The command may be rejected at 525, for example, by displaying or sending a message indicating that one or both of the ports is not available. Mirror elements associated with available ports may be disposed in respective at-rest positions.

When both the input port and output port identified in the Make command received at 510 are available ("yes" at 520), the requested connection may be provisioned at 530. To provision the connection at 530, the connection state table may be changed to indicate the input port and the output port identified in the Make command are committed to the requested connection and are no longer available for other connections. At 535, the mirror elements associated with the input port and the output port may be identified, for example by consulting the port map 322.

As previously described, mirror elements are subject to drift. When voltages are applied to electrodes associated with a mirror element, the mirror element may rotate initially to a desired position. Subsequently, the mirror element position may drift over time due to a combination of mechanical and electrical effects. To compensate for mirror element drift, an optical circuit switch may include a position optimizer, such as the position optimizer 330, to periodically adjust the position of each mirror element used in a connection to minimize the insertion loss of each connection. However, the function of the position optimizer may rely upon measurements of the input and/or output optical power for each connection. Mirror element position optimization, and thus drift compensation, may not be possible for dark or lightless connections where there is no input and output light to be measured.

FIG. 6A illustrates a problem that may occur in a lightless connection. The lower chart plots the voltage applied to a mirror electrode versus time, and the upper chart plots the mirror position on the same time scale. A connection is made at a first time point T1, causing a nominal voltage (Vnom) to be applied to the electrode. As a result, the mirror element moves from a resting position (Rest) to a required (in order to make the defined connection) position (Req). In the subsequent time period Pa, the mirror element position may drift away from the required position. Since light is not present in the connection, the drift cannot be detected or compensated. Thus the applied voltage remains constant during time period Pa.

At the end of time interval Ta, at time T2, light is transmitted through the optical connection. However, by this time the connection may have degraded or may be broken due to the accumulated mirror element position drift. During time period Pb, the position optimizer may search for an appropriate voltage that optimizes the connection. The search may be performed, for example, using a hill climbing algorithm or similar search algorithm. During time period Pb, as the search is performed, the applied voltage and the mirror element position may oscillate and the connection may be unreliable. The length of the time period Pb will depend on the magnitude of the accumulated position drift, which will in turn depend on the magnitude of the applied voltage and the duration of the time period Pa. Eventually, the correct voltage may be determined and applied to the electrodes associated with the mirror element, and the connection may be optimized. During time period Pc, the connection is established and any further mirror element position drift may be compensated automatically by the position optimizer.

FIG. 6B illustrates the operation of an optical circuit switch using the process 500. The lower chart plots the voltage applied to a mirror electrode versus time, and the upper chart plots the mirror position on the same time scale. A connection is defined at a first time point T3. At T3, the connection may be provisioned, which is to say the mirror element may be committed, but no voltage is applied to the associated electrodes during time period Pd. At time T4, light is transmitted through the optical connection. The nominal voltage (Vnom) is now applied to the electrode, causing the mirror element to move to the required position over a time period Pe, which may be much shorter than time period Pb of FIG. 6A. Subsequently, mirror element position drift during the time period Pf may be automatically compensated by the position optimizer, which may adjust the applied voltage to maintain the optimum mirror element position.

Referring back to FIG. 5, at 540 a determination may be made if input signal light is present at the input port to be connected. This determination may be made, for example, by consulting the connection state table 340, which may include flags indicating whether or not light is present at each input port. These flags may be set based on input optical power measurements made by the input optical monitoring module 370. When a determination is made at 540 that input signal light is not present at the input port to be connected, the mirrors identified at 535 may be placed in respective at-rest positions at 565. The process 500 may loop continuously between 540 and 565 until input signal light becomes present or until the mirror elements are de-provisioned by some other process (not shown).

When a determination is made at 540 that input signal light is present at the input port to be connected, the mirror elements to be used in the connection may be rotated at 545 to establish an initial connection between the input port and the output port. Rotating the mirrors at 545 may include applying nominal voltages to electrodes associated with the mirror elements. The nominal voltages may be determined, for example, by consulting the mirror calibration table 324. The nominal voltages may be applied gradually to minimize or prevent the mirror elements ringing or undergoing position oscillations.

After the initial connection is established at 545, the position optimizer may assume control of the mirror elements and optimize a rotation angle of one or both the mirror elements at 550. Optimizing the rotation angles of the mirror elements at 550 may occur periodically until a determination is made at 555 that the light in the connection has been lost or disrupted, or until a determination is made at 560 that a command to break the connection has been received. The actions at 550, 555, and 560 are shown as sequential for ease of explanation but may be performed concurrently.

A determination that the light is lost may be made at 555 if, for example, there is no light, or less than a predetermined optical power, measured by the input optical monitoring module. To avoid responding to transient conditions on the network, a determination that the light is lost may be made only if the absence of light persists for more than a predetermined time interval. The predetermined time interval may be selected to be longer than any routine transient interruption of the light. When a determination is made at 555 that the light is lost, the mirror elements may be returned to their respective at-rest positions at 565 and the process 500 may return to 540 to await the return of light at the input port. Returning the mirror elements to the respective at-rest positions may include setting the voltage on the associated electrodes to zero volts or some other default value. Mirror elements placed in their at-rest positions at 565 may nonetheless remain committed to the connection until a break connection command is received.

When a determination is made at 560 that a command to break the connection has been received, the mirror elements may be returned to their respective at-rest positions at 570. In this situation, the connection may be de-provisioned at 580 by releasing the input port and the output port for use in other connections. Releasing the ports may be performed by appropriately setting flags in the connection state table 340 to indicate that the ports are available for use in another connection. The process 500 may then end at 595.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for making a connection in an optical circuit switch, comprising:
  receiving a command to make an optical connection between a first port and a second port, the first port uniquely associated with a rotatable first mirror element and the second port uniquely associated with a rotatable second mirror element;
  determining whether or not input signal light is present at the first port;
  when light is present at the first port, rotating the first mirror element and the second mirror element to provide an initial optical connection between the first port and the second port; and
  when light is not present at the first port, waiting until light becomes present at the first port before rotating the first mirror element and the second mirror element to provide the initial optical connection.

2. The method of claim 1, wherein
  the first mirror element and the second mirror element are disposed in respective at-rest positions at the time of receiving the command to make the optical connection between the first port and the second port, and
  the method further comprises maintaining the first mirror element and the second mirror element in their respective at-rest position while waiting for light to become present at the first port.

3. The method of claim 1, further comprising:
  after rotating the first mirror element and the second mirror element to provide the initial optical connection, determining whether or not input signal light is still present at the first port; and
  if optical signal light is no longer present at the first port, returning the first mirror element and the second mirror element to respective at-rest positions.

4. The method of claim 3, further comprising:
after returning the first mirror element and the second mirror element to the respective at-rest positions, determining whether or not input signal light is again present at the first port; and
if input signal light is again present at the first port, rotating the first mirror element and the second mirror to reestablish the initial optical connection between the first port and the second port.

5. The method of claim 1, further comprising:
after rotating the first mirror element and the second mirror element to provide the initial optical connection, adjusting a rotation angle of at least one of the first mirror element and the second mirror element to reduce an insertion loss of the optical connection.

6. The method of claim 1, further comprising:
after receiving the command to make an optical connection between the first port and the second port, provisioning the connection by making the first port and the second port unavailable for any other connection, independent of the presence of input signal light at the first port.

7. The method of claim 6, further comprising:
after rotating the first mirror element and the second mirror element to provide the initial optical connection, determining if a command has been received to break the optical connection between the first port and the second port; and
when a command has been received to break the optical connection between the first port and the second port:
    returning the first mirror element and the second mirror element to respective at-rest positions, and
    de-provisioning the connection between the first port and the second port, making the first port and the second port available for other connections.

8. The method of claim 1, further comprising:
upon receiving the command to make the optical connection between the first port and the second port, determining whether or not both the first port and the second port are both available; and
if at least one of the first port and the second port are not available, rejecting the command without performing any other actions of the method.

9. An optical circuit switch, comprising:
a first port uniquely associated with a first rotatable mirror element;
a second port uniquely associated with a second rotatable mirror element;
a controller configured to:
    receive a command to make an optical connection between the first port and the second port,
    determine whether or not input signal light is present at the first port;
    when light is present at the first port, cause the first mirror element and the second mirror to rotate to provide an initial optical connection between the first port and the second port; and
    when light is not present at the first port, waiting until light becomes present at the first port before causing the first mirror element and the second mirror to rotate to provide the initial optical connection.

10. The optical circuit switch of claim 9, wherein
the first mirror element and the second mirror element are disposed in respective at-rest positions at the time of receiving the command to make the optical connection between the first port and the second port, and
the controller is further configured to maintain the first mirror element and the second mirror element in their respective at-rest position while waiting for light to become present at the first port.

11. The optical circuit switch of claim 9, wherein the controller is further configured to:
after causing the first mirror element and the second mirror element to rotate to provide the initial optical connection, determine whether or not input signal light is still present at the first port; and
if optical signal light is no longer present at the first port, cause the first mirror element and the second mirror element to return to the respective at-rest positions.

12. The optical circuit switch of claim 11, wherein the controller is further configured to:
after causing the first element and the second mirror element to return to the respective at-rest positions, determine whether or not input signal light is again present at the first port; and
if optical signal light is again present at the first port, cause the first mirror element and the second mirror element to rotate to reestablish the initial optical connection between the first port and the second port.

13. The optical circuit switch of claim 9, wherein the controller is further configured to:
after causing the first mirror element and the second mirror element to rotate to provide the initial optical connection, adjust a rotation angle of at least one of the first mirror element and the second mirror element to reduce an insertion loss of the optical connection.

14. The optical circuit switch of claim 9, wherein the controller is further configured to:
after receiving the command to make an optical connection between the first port and the second port, provision the connection by making the first port and second port unavailable for any other connection, independent of the presence of input signal light at the first port.

15. The optical circuit switch of claim 14, wherein the controller is further configured to:
after rotating the first mirror element and the second mirror element to provide the initial optical connection, determine if a command has been received to break the optical connection between the first port and the second port; and
when a command has been received to break the optical connection between the first port and the second port:
    cause the first mirror element and the second mirror element to return to the respective at-rest positions, and
    de-provision the connection between the first port and the second port, making the first port and the second port available for other connections.

16. The optical circuit switch of claim 9, wherein the controller is further configured to:
upon receiving a command to make the optical connection between the first port and the second port, determine whether or not the first port and the second port are available; and
if at least one of the first port and the second port are not available, reject the command without performing any other actions.

17. The optical circuit switch of claim 9, further comprising:
a plurality of input ports including the first port, each of the plurality of input ports uniquely associated with a respective one of a plurality of rotatable mirror elements, including the first mirror element, in an input mirror array; and a plurality of output ports including the second port, each of the plurality of output ports uniquely associated with a respective one of a plurality of rotatable mirror elements, including the second mirror element, in an output mirror array.

18. A method for making connections in an optical circuit switch, comprising:
receiving a command to make one or more optical connections, each optical connection between an input port from a plurality of input ports and an output port from a plurality of output ports, each of the input ports and the output ports uniquely associated with a respective rotatable mirror element; and
for each of the one or more optical connections:
determining whether or not input signal light is present at the respective input port,
when light is present at the respective input port, rotating the mirror elements associated with the respective input port and the respective output port to provide an initial optical connection between the respective input port and the respective output port, and
when light is not present at the respective input port, waiting until light becomes present at the respective input port before rotating the mirror elements associated with the respective input port and the respective output port to provide the initial optical connection.

19. The method of claim 18, wherein, for each of the one or more optical connections:
the mirror elements associated with the respective input port and the respective output port are disposed in respective at-rest positions at the time of receiving the command to make the optical connection between the input port and the output port, and
the method further comprises maintaining the mirror elements associated with the respective input port and the respective output port in their respective at-rest position while waiting for light to become present at the input port.

20. The method of claim 18, further comprising, for each of the one or more optical connections:
after rotating the mirror elements associated with the respective input port and the respective output port to provide the initial optical connection, determining whether or not input signal light is still present at the respective input port; and
if optical signal light is no longer present at the respective input port, returning the mirror elements associated with the respective input port and the respective output port to the respective at-rest positions.

21. The method of claim 20, further comprising, for each of the one or more optical connections:
after returning the mirror elements associated with the respective input port and the respective output port to the respective at-rest positions, determining whether or not input signal light is again present at the respective input port; and
if optical signal light is again present at the respective input port, rotating the mirror elements associated with the respective input port and the respective output port to reestablish the initial optical connection between the respective input port and the respective output port.

22. The method of claim 18, further comprising, for each of the one or more optical connections:
after rotating the mirror elements associated with the respective input port and the respective output port to establish the initial optical connection, adjusting a rotation angle of at least one of the mirror elements associated with the respective input port and the respective output port to reduce an insertion loss of the optical connection.

23. The method of claim 18, further comprising, for each of the one or more optical connections:
after receiving the command to make the optical connection between the respective input port and the respective output port, provisioning the connection by making the respective input port and the respective output port unavailable for any other connection, independent of the presence of input signal light at the respective input port.

24. The method of claim 23, further comprising, for each of the one or more optical connections:
after rotating the mirror elements associated with the respective input port and the respective output port to establish the initial optical connection, determining if a command has been received to break the optical connection; and
if a command has been received to break the optical connection:
returning the mirror elements associated with the respective input port and the respective output port to the respective at-rest positions, and
de-provisioning the connection, making the respective input port and the respective output port available for other connections.

25. The method of claim 18, further comprising, for each of the one or more optical connections:
upon receiving the command to make the optical connection between the respective input port and the respective output port, determining whether or not the respective input port and the respective output port are available; and
if at least one of the respective input port and the respective output port is not available, rejecting the command without performing any other actions of the method.

* * * * *